Figure 1:
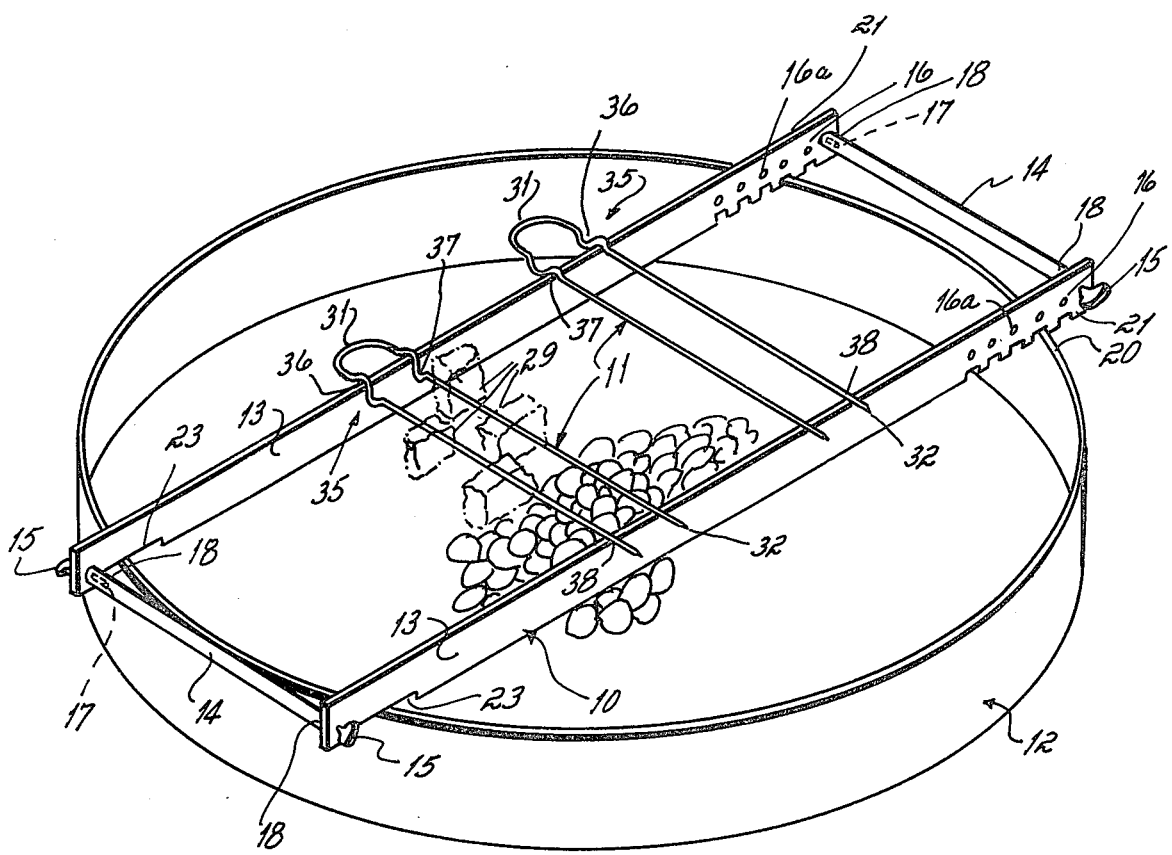

United States Patent [19]

Conradt

[11] 4,324,174
[45] Apr. 13, 1982

[54] APPARATUS FOR THE PREPARATION OF SHISH KABOBS

[76] Inventor: James C. Conradt, 1450 Lawrence Ave., Hamilton, Ohio 45013

[21] Appl. No.: 212,358

[22] Filed: Dec. 3, 1980

[51] Int. Cl.$^3$ ............................................. A47J 37/04
[52] U.S. Cl. ................................. 99/421 H; 99/427; 126/9 R; 211/60 R; D7/129
[58] Field of Search ................. 99/419, 421 R, 421 H, 99/421 HH, 427, 443 R; 211/60 R; 126/9 R, 25 AA, 41 B; 248/110; D7/129

[56] References Cited

U.S. PATENT DOCUMENTS

| | | | |
|---|---|---|---|
| 2,521,220 | 9/1950 | Huntington | 99/419 |
| 2,922,358 | 1/1960 | Schurr | 99/419 |
| 3,297,166 | 1/1967 | Summers | 211/60 R |
| 3,858,495 | 1/1975 | Gotwalt | 99/421 HH |

FOREIGN PATENT DOCUMENTS 478044  1/1938  United Kingdom .

Primary Examiner—Billy J. Wilhite
Attorney, Agent, or Firm—Wood, Herron & Evans

[57] ABSTRACT

Apparatus designed to prepare shish kabobs over charcoal, outdoor gas type grills, as well as indoor ovens and the like. The apparatus comprises a rectangular frame designed to rest on the rim of a grill or to fit within a grill supported by the grillwork and a plurality of "U"-shaped skewers which are specifically shaped to securely fit upon the rectangular frame.

6 Claims, 2 Drawing Figures

APPARATUS FOR THE PREPARATION OF SHISH KABOBS

This invention relates to barbecue apparatus, and more particularly, the invention relates to apparatus for barbecuing diverse foodstuffs mounted on skewers as in preparing shish kabob.

Barbecuing of food mounted on skewers has presented a number of problems. The first problem arises with the threading of the foodstuffs onto the skewers. The more fragile foods, such as potatoes and mushrooms, tend to break, resulting in waste. Where a number of skewers are being prepared as for a party, it is desirable to have all the skewers uniformly loaded and uniformly positioned intermediate the ends of the skewers. Where a number of people are assisting in the threading of the skewers, this uniformity is almost impossible to attain. Present skewers provide no indicia for uniformly threading food on them.

When the loaded skewers are placed on the grill, there is a tendency of some of the foodstuffs to stick to the grill, and where these foodstuffs are fragile, they may be pulled off the skewers as the skewers are manipulated, thereby resulting in additional waste.

In rotating the skewers to cook the food on both sides, additional problems arise. If the foodstuff is not perfectly centered on the skewer, or if the hole created by the skewer is large, or if there is a combination of both factors, the foodstuff will not rotate as the skewer is rotated making it difficult to cook the food on both sides.

Skewers normally have no means for preventing their inadvertent displacement on the grill and can be accidentally rolled off the grill by bumping the skewer or the grill.

A number of solutions to the foregoing problems have been attempted. It is known to provide a rack to be positioned on top of the barbecue grill. The rack, having a sufficient vertical dimension, maintains the foodstuffs from contact with the grill and hence avoids sticking. Other proposals include specially shaped skewers, such as flat, cross section skewers, designed to prevent the product from rotating with respect to the skewer when the skewer is rotating. Such specially shaped skewers, however, have the problem of tending to break up the more fragile products.

Another approach has been to provide a helical skewer. This concept might be alright if the operator carefully threaded the skewer into the product by rotating the skewer. In practice, however, more than likely the operator will simply thrust the skewer directly into the product, thereby reaming out a hole which worsens the problem rather than solving it.

It has been an objective of the present invention to provide improved apparatus for skewing and barbecuing wherein the tendency of the foodstuff to break up is greatly reduced, wherein the foodstuff can easily be uniformly positioned on the skewer, wherein the skewers can be rotated with assurance that the foodstuff will not slip with respect to the skewer, and wherein the skewers will be securely positioned on the barbecue and blocked against inadvertent displacement.

This objective of the invention is attained by providing a rectangular rack presenting two parallel supports having a substantial vertical dimension upon which skewers may be mounted. The invention further provides "U"-shaped skewers consisting of thin prongs about 0.090 inch in diameter interconnected at one end by a bight portion.

The thin prongs permit each item of food to be slid on a single prong with practically no damage to the food item. Additional food items are slid onto alternate prongs, preferably in contact with one another, so as to present an interlocking assemblage of food items on the prongs. This interlocking relationship prevents the food items from rotating with respect to the individual prongs when the skewer itself is rotated to reverse its position on the grill.

Adjacent the bight portion of the skewer, the prongs are bent in an "S"-shaped fashion to provide two pairs of oppositely-facing indentations. These indentations are engageable with one of the opposed skewer supports to position the skewers against inadvertent movement in one position of the skewers with the adjacent indentations positioning the skewers in the opposite or 180° rotated position. The indentations serve the added function of providing indicia for positioning the foodstuffs uniformly when they are mounted on the skewer. In other words, if instructions are to slide the foodstuff down to the first indentation, then all skewers will be similarly loaded.

The rack preferably has a plurality of notches suitable for positioning the rack on the grill with the upwardly-projecting edge of the grill received in the recesses in the rack. Thus, the rack, when properly positioned on the grill, is blocked against inadvertent displacement.

It can be seen that with the rack properly seated on the grill and with the skewers properly seated on the racks with the indentations in engagement with the skewer supports, the whole assembly is reasonably secure against inadvertent displacement and properly positioned with respect to the coals.

Finally, the invention provides adjustable means for securing transverse elements to the support members so that the length of the frame can be shortened to accommodate the frame to smaller grills.

Figure 2:
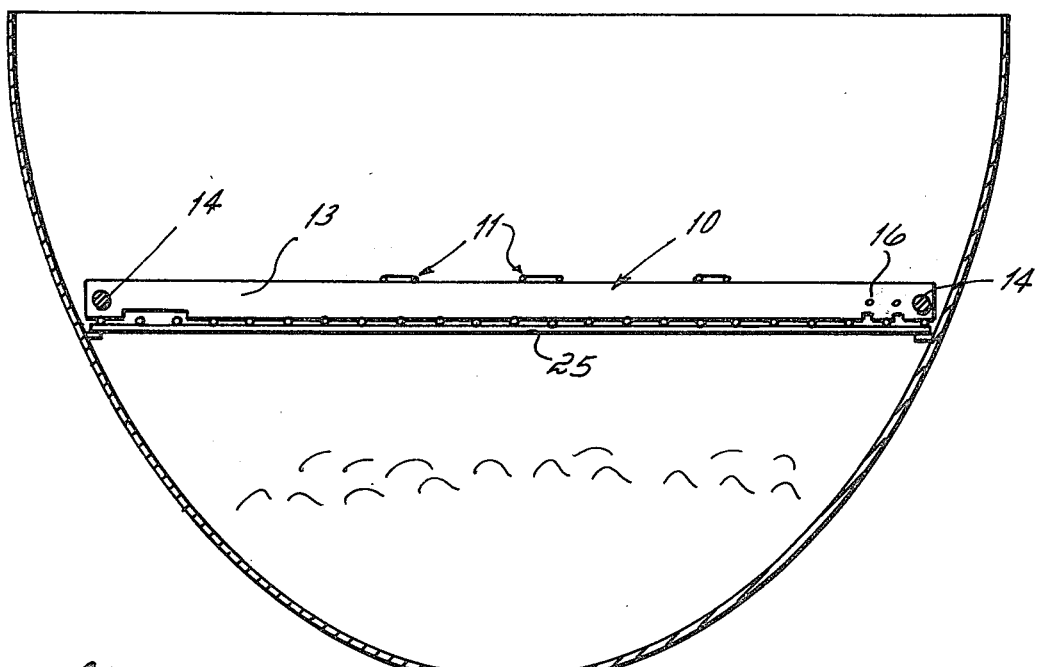

The several features and objectives of the invention will become more readily apparent from the following detailed description taken in conjunction with the accompanying drawings in which:

FIG. 1 is a perspective view showing the apparatus of the invention mounted on a grill; and FIG. 2 is a diagrammatic cross-sectional view showing the apparatus mounted in a deep kettle-type grill.

The present invention comprises a rectangular frame 10 in combination with a plurality of "U"-shaped skewers 11 which are specially adapted to rest securely upon the frame. These are provided to enable one to prepare shish kabobs over an open charcoal grill 12.

The rectangular frame has two opposed parallel skewer support members 13 connected to each other at either ends by transverse members 14. Each transverse member is attached to the ends of the two support members by means of bolts 15 passing through one of a series of bolt holes 16 located at the ends of the skewer support members 13 into internally threaded axial holes 17 at both ends 18 of each transverse member 14.

Each support member 13 should be long enough so that both ends extend beyond the rim 20 of the grill. A maximum dimension of thirty inches should suffice. The frame is designed to fit upon various sizes of charcoal or gas grills. Preferably, the frame would rest upon the top of the grill supported by the rim 20 of the grill. To prevent the frame from inadvertent displacement and even sliding off the grill, one end of both skewer support members 13 include a series of notches 22, each about ¼ inch square on one inch center. At the other end of each support member, there is provided one elongated notch or recess 23 about one inch long by ¼ inch deep. The rim of the grill 12 will fit within four notches, one notch at each end of both support members as shown in FIG. 1. Thus, in preferred use, the frame is placed upon the rim 20 of the grill 12 with a notch 22 at one end of each support member and a recess 23 at the opposite end of each support member fitting over and seating upon the rim.

The present frame is designed to be cut down to a desired size so as to be positionable symmetrically on smaller grills. To provide for this, each support member includes a series of bolt holes 16 by means of which the transverse members can be attached to the support members. To reduce the size of the frame, the transverse member is constructed as described before, but inner holes such as 16a are used to attach the transverse member to the support member. The size of the frame can now be reduced by cutting that portion 21 of the support members which extend beyond the holes 16a in use. To further provide for this, the support members should be formed of a soft metal, such as aluminum which can easily be cut with a hack saw.

Some grills, FIG. 2, (e.g., the Weber TM grill) are so deep that food supported on a frame resting on the rim would not be cooked as quickly as desired. This is frequently the case with charcoal grills which do not have a means to adjust the height of the charcoal. Therefore, this frame is designed to be placed within the grill, resting on the grillwork 25 within the grill. As described above, the frame would not fit into the grill since the support members would extend beyond the outer edge or rim of the grill. To facilitate placement of the frame within the grill, the size of the frame can be reduced as described above to a size small enough to permit it to properly fit upon the grillwork 25, thereby placing the frame, as well as food supported on the frame, closer to the coals.

It should be understood that the location, number and size of the notches on the underside of the support members may be varied to specially adapt the frame to almost any grill, oven broiler, stove top grill, Jenn-Aire ® facility or the like.

The skewers 11 are simple in construction, but specifically adapted for use in the preparation of shish kabobs, and specially adapted to securely rest upon frame 10. The skewers are "U"-shaped having two leg portions or prongs which are connected by a bight portion 31. The prongs each include a pointed tip 32 to enable impalement of food. Further, the diameter of each prong is small, about 0.090 inch, which minimizes the possibility of breaking apart of fragile foods, such as mushrooms when they are impaled.

The skewers are also provided with complementary "S"-shaped bends 35 on each prong which provide indentations or seats 36, 37 to hold the skewers in place upon the frame 10. As shown in FIG. 1, no matter which side of the skewer is resting on the frame, each prong will have an indentation 36 or 37 to provide a seat on the frame to maintain the skewer in place. Specifically, the skewers rest upon the frame 10 with an end portion 38 of the skewer prongs resting on support member 13 and the one indentation 36 or 37 of the "S"-shaped bend portion of each prong resting on the opposite support member 13. Upon rotation of the skewer, the other indentation will rest upon the frame, thereby stabilizing the skewer. This is particularly important in the preparation of shish kabobs which requires the skewers holding the food to be flipped or rotated 180°. The identations 36 and 37 permit the skewer to be securely seated on the support 13, both initially and after rotation of the skewer.

The "S"-shaped bend also acts as an indicia of the extent to which the food should be slid down the prongs and actually acts as an abutment means preventing food from being placed too near the bight portion of the skewers.

In operation, the frame is placed upon a lighted charcoal or gas grill. Preferably, this is accomplished by simply placing the frame upon the top of the grill so that a notch 22 and recess 23 on each end of both support members fit upon the rim 20 of the grill 12.

Pieces of food 29, such as chunks of meat, potatoes, and wedges of tomatoes and the like are placed on the skewers in a way peculiar to this type of skewer. A piece of food is positioned on one prong of the skewer all the way up to the "S"-shaped bend. Then a second piece of food is placed on the other prong. Additional pieces of food are placed on alternating prongs until the skewer is almost filled. The pieces of food should be tightly packed so that pieces of food on one prong are jammed against food on the other prong, and are thus prevented from rotating with respect to the prong. The small end portion 38 of the skewer is left free from food to provide a surface to rest upon the frame.

Once the frame is in position and the food is positioned on the skewers, the skewers are placed on the frame so that indentation on each prong of a skewer seats on a support member of the frame and the tip end of the skewers rest on the opposite support member. When it is desired to turn the food to cook the opposite side, the skewers are rotated 180° and positioned so that the opposite indentation of the "S"-shaped bend rests on the support members. In this manner, the skewers always securely rest upon the frame.

From the previous discussion, it will be obvious for one of ordinary skill in the art to make minor changes without exceeding the scope of the invention. Having thus fully described the construction and operation of this invention, I claim:

1. Apparatus for preparing shish kabobs comprising:
   a rectangular frame adapted to rest on a grill and having two opposed spaced skewer supports,
   a plurality of "U"-shaped skewers presenting two prongs connected by a bight portion resting upon said two skewer supports,
   abutment means adjacent the bight portion of said "U"-shaped skewers limiting the extent to which food is slid down said prongs to said bight portion.

2. Apparatus as in claim 1 in which said abutment means comprises an "S"-shaped bend in each prong,
   said "S"-shaped bends providing oppositely facing indentations each adapted to receive a skewer support and maintain the position of the skewer on the support against inadvertent displacement,
   whereby food mounted on said skewers may be cooked on both sides by reversing the position of the skewers on the supports and securing the skewers by positioning one set of indentations on one of the support.

3. Apparatus as in claim 1 wherein said supports include downwardly facing notches adjacent their ends, said notches being engageable with the rim of a barbeque grill or the like to secure it against inadvertent displacement.

4. Apparatus as in claim 3 in which said supports have a plurality of longitudinally spaced notches in one end thereof and at least one notch in the other end thereof to accommodate said supports to grills of varying dimensions.

5. Apparatus as in claim 1 wherein said frame further comprises:
   at least two transverse members joined to and spacing said skewer supports apart,
   said supports having a plurality of longitudinally spaced bolt holes in at least one end portion of said each support,
   and bolts connecting said supports to said transverse members,
   whereby the length of said support may be shortened to decrease the length.

6. Apparatus for preparing shish kabobs comprising:
   a rectangular frame adapted to rest upon a grill including two opposed, spaced skewer supports each having two end portions, and each support member having a plurality of downwardly facing notches, at least one located at one end portion of each support member, and a plurality of notches located at the other end portion of each support member;
   a plurality of "U"-shaped skewers, each including two opposed prings connected by a bight portion, each prong including an "S"-shaped bend providing alternating indentations;
   whereby food may be positioned piece by piece on alternate prongs of a skewer thereby interlocking the pieces of food and preventing rotation of the food relative to the prongs, and
   whereby indicia is provided for determining the extent to which food should be pushed down the prongs of the skewer; and
   whereby each skewer rests securely on said frame, prevented from being inadvertently dislocated by means of one notch at each end of each support member resting on the rim of the grill.

* * * * *